Oct. 11, 1960  C. J. KINSEY  2,955,876
WHEEL BALANCING MEANS
Filed April 24, 1958
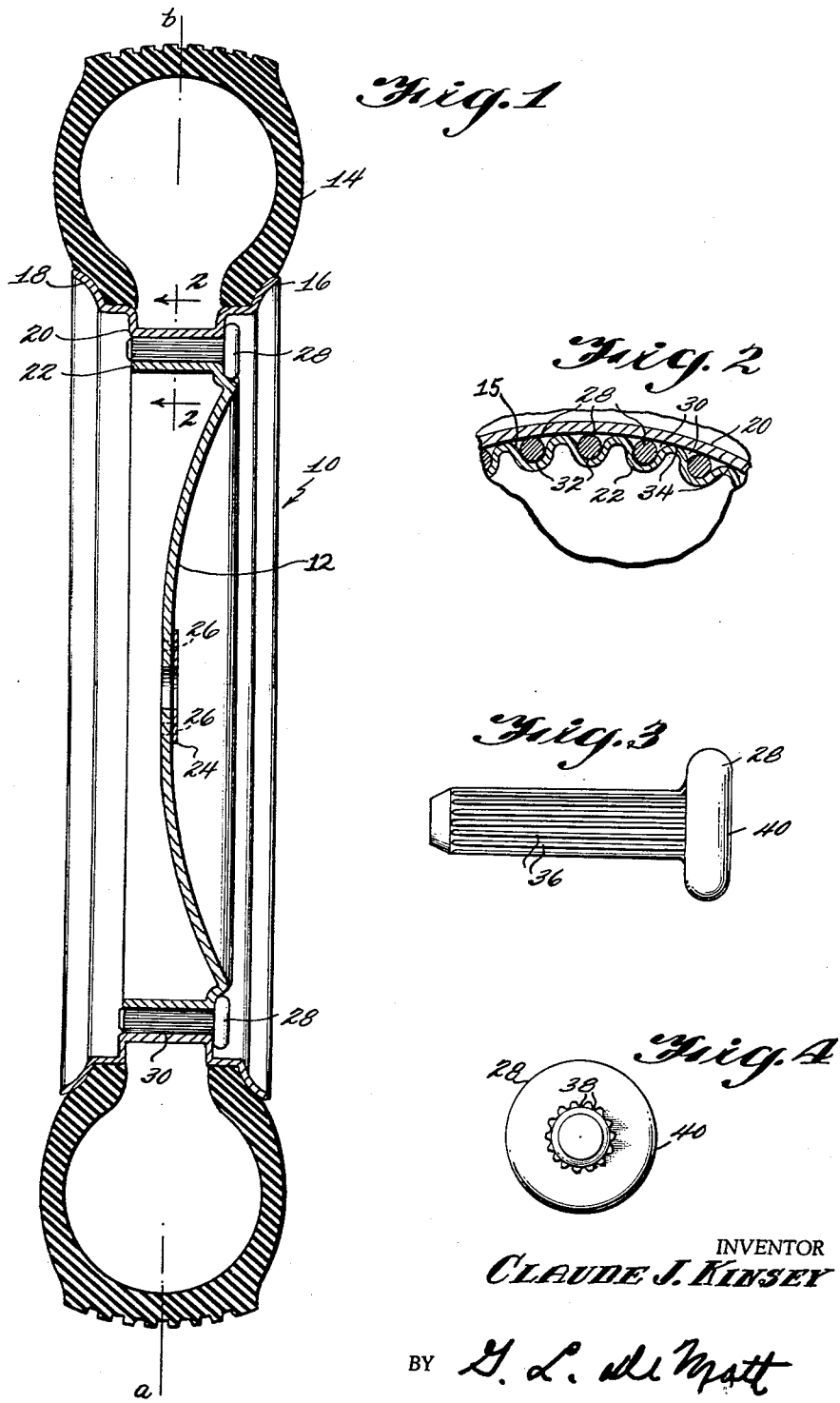
INVENTOR
CLAUDE J. KINSEY
BY G. L. deMatt
ATTORNEY

United States Patent Office 2,955,876
Patented Oct. 11, 1960

2,955,876

WHEEL BALANCING MEANS

Claude J. Kinsey, Detroit, Mich., assignor to General Motors Corporation, Detroit, Mich., a corporation of Delaware Filed Apr. 24, 1958, Ser. No. 730,671

4 Claims. (Cl. 301—5)

This invention relates generally to means for balancing wheels, and more particularly to the attachment of weights to vehicle wheels for balancing the same.

It has been recognized in the past that it would be desirable to obviate the necessity of placing weights on the inner and outer flanges of a vehicle wheel tire rim. This is desirable because of the unsightly appearance of the lug weights, the possibility of unknowingly losing the weights and causing excessive tire wear, and the added cost of using a pair of weights at each position of unbalance.

Attempts have been made to correct these problems by utilizing a weight retaining ring or annulus located approximately in a plane passing through the longitudinal center of the wheel behind the conventional support member or disk. It has also been suggested that the flange utilized to attach the support disk to the rim felly be extended to provide a place for attaching the weights. The method of providing an additional annulus or ring has proven unsatisfactory because of the added cost for installation and additional annulus material. Also the fact that access to these annuluses may be gained only from the axle side of the wheel makes installation of the balancing weights inconvenient. This is particularly true when the practice is to balance the wheels on the axle.

Thus a principal object of this invention is to provide an improved means of attaching weights to a rotatable wheel for balancing it. More specifically, an object of the invention is to provide an improved vehicle wheel assembly including attaching means for balancing weights wherein receptacles are provided for the weights that are integral with the conventional wheel structure, require no additional materials or assembly operations, and which are easily accessible but hidden from view.

Other objects and advantages of the invention will be apparent from the following description:

In the accompanying drawing,

Figure 1 is a vertical sectional view of a vehicle wheel assembly on a longitudinal plane passing through the central axis of the wheel and illustrating a preferred embodiment of the invention;

Figure 2 is a fragmentary side view in section of the rim attachment to the support disk taken along line 2—2 of Figure 1;

Figure 3 is an enlarged side view of a balance pin employed in the embodiment of Figure 1; and Figure 4 is an end view of the balance pin of Figure 3.

As shown in Figure 1, a conventional drop center tire rim 10 is supported by the center disk 12. A tire 14 is seated between the rim flanges 16 and 18 of the wheel rim 10. The drop center portion designated by the felly 20 is suitably attached to a transverse flange extension 22 of the support disk 12. The periphery of the support disk 12 may have any structural shape adapted to form a secure attachment to the wheel rim 10. This attachment may be made by means of welding, riveting, or other suitable processes. An attaching flange 24 is provided at the center of the disk support 12 with holes 26 to receive the conventional studs of an axle hub (not shown). Pins 28 are shown in the apertures 30 provided between the felly 20 and the disk flange 22. The apertures 30 open at the outward lateral surface 15 of the support member 12.

In Figure 2 the outer flange 22 of the support disk 12 is shown with a plurality of grooves or recesses 32 which define the apertures 30 when attached to the felly 20. The depressions or grooves 32 are regularly spaced around the periphery of the attaching flange 22. The apexes 34 formed between the grooves 32 provide the support surface to which the felly 20 is welded or riveted. The support disk 12 is secured to the felly 20 proximate to the longitudinal center line a—b.

The advantages of this invention may also be obtained by forming depressions or grooves on both the inner peripheral surface of the rim 10 and the outer peripheral surface of the support disk 12 to define apertures 30 in the assembled position. Similarly, the depressions or grooves could be formed on the inner periphery of the rim 10 alone. A further embodiment of this invention might utilize a plurality of circumferential apertures formed integrally with a conventional support member 12 and spaced radially inwardly from the inner periphery of the rim 20.

Figures 3 and 4 show a balance pin 28 which may be made of steel, lead, or other material having sufficient balancing mass. The diameter of the shank 36 of the pin 28 is slightly greater than the space provided in the aperture 30 so that assembly will require a drive fit. Thus the pins 28 will be frictionally held within the grooves 32. Serrations 38 are provided on a shank of the pin 28 to facilitate its insertion into the apertures 30 and to maintain its frictional fit. The pin 28 may be of any desired shape. The preferred balance weight embodiment shown illustrates a pin with a head 40. Of course other structure and means of securing the balance weights within the apertures could be used such as a nut and bolt, a resiliently deformable pin, a spring clip, etc.

The wheel balancing operation is done in the usual manner to determine the points of static and dynamic unbalance. The balance pins 28 are then inserted into the space or spaces defined by the apertures 30 to correct the condition of unbalance. As many pins may be used as are necessary to correct the unbalanced condition.

From the foregoing description it is obvious that a convenient and useful means of balancing vehicle wheels has been provided which requires no additional materials or parts than conventional wheel structure. This simplified means of balancing wheels teaches a way to place the weights out of sight and in a manner which securely holds them against the normal centrifugal forces of wheel rotation. This reduces the possibility of loosening the balancing weights to a minimum. Since the weights are placed approximately on the centerline a—b of the wheel, one weight will now be sufficient, where in the usual previous practice two would be needed. The invention facilitates the use of a steel balance pin rather than the customary lead rim clip. Since the difference in cost between lead and steel is considerable this invention results also in a substantial having in cost for the balance weights.

It is apparent that various structural modifications may be made in the device which has been described and the scope of the invention is not intended to be limited by the illustrated embodiment.

What is claimed is:

1. A vehicle wheel comprising in combination a tire receiving rim rigidly secured to a support member, said support member and said rim defining a plurality of circumferentially spaced apertures opening at the outer lateral surface of said support member, and a pin received in and retained by one of said apertures as a balancing weight for said wheel, said apertures being closely spaced about the periphery of said support member whereby said pin may be inserted at various positions to effectively balance said wheel.

2. A vehicle wheel comprising in combination an outer rim rigidly attached to a support member, said support member being provided with a plurality of recesses along its peripheral edge, means to rigidly attach said rim to said support member at the apexes formed between said recesses to define a plurality of circumferentially spaced apertures, and a pin received in and retained by one of said apertures as a balancing weight, said recesses having a width equal to or slightly smaller than the diameter of said pin whereby said pin will be frictionally supported within said grooves.

3. Means for balancing a vehicle wheel comprising in combination a tire receiving rim; a support member for said rim having a peripheral flange, a plurality of semi-cylindrical grooves regularly spaced about the circumference of said flange, a rigid connection between said rim and said support member formed at the apexes of said grooves, adjacent peripheral surfaces of said rim and said grooves defining a plurality of circumferentially regularly spaced apertures; and a pin having a serrated shank adapted to be received and retained by one of said apertures as a wheel balancing weight, said grooves having a width equal to or slightly smaller than the diameter of said pin whereby said pin will be frictionally supported within said grooves.

4. A vehicle wheel comprising in combination a tire receiving rim; a support member for said rim having a peripheral flange, a plurality of semi-cylindrical grooves regularly spaced about the circumference of said flange, said grooves defined by spaced transverse walls on the periphery of said flange, a rigid connection between said rim and said support member at the apexes of said grooves, adjacent peripheral surfaces of said rim and said grooves defining a plurality of circumferentially regularly spaced apertures; a pin adapted to be received and retained by one of said apertures as a wheel balancing weight, and said transverse walls being spaced from one another by a distance equal to or slightly smaller than the diameter of said pin whereby said pin is frictionally retained within said apertures by surface contact between said pin and each of said walls.

References Cited in the file of this patent

UNITED STATES PATENTS

| | | |
|---|---|---|
| 121,411 | Phelps | Nov. 28, 1871 |
| 2,640,729 | Niven | June 2, 1953 |
| 2,830,168 | Taylor | Apr. 8, 1958 |